(12) United States Patent
Wilhelm et al.

(10) Patent No.: US 10,003,104 B2
(45) Date of Patent: *Jun. 19, 2018

(54) METHOD FOR EFFECTING A SLEEP MODE OF A CELL SUPERVISION CIRCUIT OF A LITHIUM-ION RECHARGEABLE BATTERY AND LITHIUM-ION RECHARGEABLE BATTERY

(71) Applicant: Robert Bosch GmbH, Stuttgart (DE)

(72) Inventors: Joerg Christoph Wilhelm, Stuttgart (DE); Volkher Hofmann, Kirchheim/Teck (DE); Marc Heydemann, Stuttgart (DE); Holger Wetzel, Tübingen (DE)

(73) Assignee: Robert Bosch GmbH, Stuttgart (DE)

( * ) Notice: Subject to any disclaimer, the term of this patent is extended or adjusted under 35 U.S.C. 154(b) by 192 days.

This patent is subject to a terminal disclaimer.

(21) Appl. No.: 14/495,526

(22) Filed: Sep. 24, 2014

(65) Prior Publication Data

US 2015/0086814 A1    Mar. 26, 2015

(30) Foreign Application Priority Data

Sep. 25, 2013    (DE) .................. 10 2013 219 301

(51) Int. Cl.
*H01M 10/00*    (2006.01)
*H01M 10/42*    (2006.01)
*H02J 7/00*     (2006.01)
*H01M 10/0525*  (2010.01)

(52) U.S. Cl.
CPC ......... *H01M 10/425* (2013.01); *H02J 7/0029* (2013.01); *H01M 10/0525* (2013.01); *H01M 2010/4271* (2013.01); *H01M 2220/20* (2013.01); *H02J 2007/004* (2013.01)

(58) Field of Classification Search
CPC ............. H02J 7/0029; H02J 2007/004; H01M 2010/4271; H01M 10/425; H01M 2220/20; H01M 10/0525
See application file for complete search history.

(56) References Cited

U.S. PATENT DOCUMENTS 9,203,248 B2* 12/2015 Ohkawa ............... B60L 3/0046
2010/0222980 A1  9/2010 Berr
2012/0175953 A1*  7/2012 Ohkawa ............... B60L 3/0046
                                                307/18
2013/0099755 A1  4/2013 Lei

FOREIGN PATENT DOCUMENTS

DE    102011075846    11/2012

* cited by examiner

*Primary Examiner* — Nicholas P D'Aniello
(74) *Attorney, Agent, or Firm* — Michael Best & Friedrich LLP

(57) ABSTRACT

Effecting a sleep mode of a cell supervision circuit of a rechargeable battery, in which the cell supervision circuit is not in the sleep mode after at least one sleep command sent to the cell supervision circuit, and in which a command for a software reset of the cell supervision circuit is sent to the cell supervision circuit after confirmation of the sleep mode is absent.

6 Claims, 2 Drawing Sheets

METHOD FOR EFFECTING A SLEEP MODE OF A CELL SUPERVISION CIRCUIT OF A LITHIUM-ION RECHARGEABLE BATTERY AND LITHIUM-ION RECHARGEABLE BATTERY

BACKGROUND OF THE INVENTION

The present invention relates to methods for effecting a sleep mode of a cell supervision circuit of an electrochemical cell which circuit is not in the sleep mode after at least one sleep command sent to the cell supervision circuit. The invention also relates to a lithium-ion rechargeable battery.

A rechargeable battery is typically used as energy source in electrically driven vehicles. Lithium-ion rechargeable batteries are often used since these have the largest energy density available to date with the lowest weight. However, said rechargeable batteries are very sensitive with respect to overcharging and also exhaustive discharge. In the case of overcharging above a particular voltage value per cell, usually about 4.25 V, the cell becomes unstable and a self-amplifying heating process (thermal runaway) can be initiated. Discharging below a particular threshold also encourages adverse chemical processes in the cell which lead to irreversible damage of said cell. For this reason, there is a rechargeable battery management system which, by means of a control device of the rechargeable battery and by means of cell supervision circuits on individual cells of the rechargeable battery, often on all of the cells, monitors the cell voltages and can be involved in triggering countermeasures. By way of example, over- and undercharging are suppressed by opening a main switching device which may comprise, for example, one or more charging or main load contactors. This is referred to as exhaustive discharge protection. During operation of an electrically driven vehicle, a situation may occur in which the installed rechargeable battery is exhausted by the driving operation, for example as a result of relatively long diversions, increased energy consumption, faulty operation of a controlled charging station or the like. Said exhaustion of the rechargeable battery is expressed in that a low voltage threshold of one or more cells is reached, which can be detected by means of the cell supervision circuits connected to the cells and upon which the exhaustive discharge protection can be activated. It is disadvantageous in this case that, even if the exhaustive discharge protection engages, that is to say the main switching device to all external consumers is open, the power supply of the cell supervision circuits is still maintained under certain conditions, for example in the case of an accident with mechanical damage to the battery control electronics, short-circuits caused by electromigration, software errors or programming errors in the rechargeable battery management system, incompatibilities or exhausted system resources. The cell supervision circuits are not part of the external consumers, but rather they remain connected to the respective electrochemical cells, even if, for example, a main contactor is open. Usually, the cell supervision circuits are not transferred into their sleep mode by the exhaustive discharge protection but rather by means of a sleep command, which can fail. In this situation, the cell supervision circuits still consume current from the rechargeable battery. Particularly when this takes place over a relatively long period of time, there is an acute danger of exhaustive discharge, especially as the rechargeable battery may already be in a state of maximum permissible discharge anyway after a relatively long driving operation.

The same may also take place when the lithium-ion rechargeable battery is transferred into a sleep mode after the electric motor has been switched off. In this case, end consumers in the low-volt range shut down their current requirement and the control device sends a sleep command to the cell supervision circuits. If a cell supervision circuit is erroneously not transferred into the sleep mode, there is a threat of an exhaustive discharge, as described above.

It is conceivable to send a sleep command to the cell supervision circuits, for example, via a CAN bus. In this case, the sending of the sleep command can be connected to a confirmation request at a cell supervision circuit and the receipt of a confirmation of the sleep mode by the cell supervision circuit, for example via a CAN bus, can be expected. If this fails, the sleep command can thus be sent again and this can be repeated for all cell supervision circuits which have not responded until all cell supervision circuits have responded. The above-mentioned method can be performed while a main switching device of the lithium-ion rechargeable battery, by means of which electrical current flow from and to the lithium-ion rechargeable battery can be interrupted, is open. Preferably, when the main switching device is opened, a signal is sent to the user about this event, particularly when the main switching device has been opened because a low state of charge of the lithium-ion rechargeable battery is present, which is preferably notified to the user. The number of sleep commands and/or confirmation requests to the cell supervision circuit can be stored, in particular in the control device which sends the sleep command and/or a confirmation request to the cell supervision circuits. Optionally, a cell supervision circuit from which no confirmation has been received at the control device after a predefined number of sleep commands and/or confirmation requests can be compulsorily isolated from its cell to be monitored such that said cell to be monitored is no longer discharged by the cell supervision circuit, in particular by means of interruption devices provided for this purpose for the connection between the cell supervision circuit and its cell and electrical connections of a compulsory disconnection device, which is preferably the control device, to said interruption devices. Preferably, the user of the lithium-ion rechargeable battery or, alternatively or additionally, a receiver who is not the user, for example a workshop, an emergency service, the manufacturer of a vehicle in which the lithium-ion rechargeable battery is installed, the manufacturer of the lithium-ion rechargeable battery or the like, is informed about such a compulsory disconnection, for example by means of a mobile telephone network.

It is disadvantageous in the method depicted above that, in the event of a system disturbance in a cell supervision circuit, for example as a result of a short-circuit caused by electromigration in the monitored cell, a software error, incompatibility or exhaustion of system resources or the like, the power supply is not transferred into the sleep mode, but rather the cell is compulsorily disconnected. This is disadvantageous because this represents an abnormal operating state the management of which causes increased expenditure.

SUMMARY OF THE INVENTION

According to the invention, a method is proposed for effecting a sleep mode of a cell supervision circuit which has not responded to a sleep command by transferring into the sleep mode. According to the invention, a command for a software reset is sent to such a cell supervision circuit. By means of such a software-reset command, a reboot or reset of the cell supervision circuit to a defined start point in a program sequence is effected in the cell supervision circuit. Furthermore, a temporary memory is preferably erased or reset to standard values. The software-reset command can be sent to a reset input of a processor, of a GAL, of an FPGA or of a DSP or the like in the cell supervision circuit. Alternatively, a software reset can also be sent as a data-encoded command via a data connection. Preferably, software is implemented in the cell supervision circuit, which responds to appropriate software-reset data by rebooting or resetting to a defined start point in a program sequence. The software-reset command is sent to a cell supervision circuit, after it has been determined that said cell supervision circuit is not in the sleep mode. By means of a software reset according to the invention, any system disturbances of cell supervision circuits can be remedied and the functionality thereof can be recovered, which is particularly advantageous if this takes place at a suitable instant. Particularly if the non-execution of the sleep command is based on a system disturbance of a cell supervision circuit, for example owing to a short-circuit caused by electromigration, a software error, a programming error, incompatibilities or exhausted system resources or the like, then it is more likely a confirmation will be sent after a renewed sleep command. Thus, an additional process is implemented which, in certain circumstances, can prevent a discharging of the rechargeable battery. In the best case, the full capacity and functionality of the rechargeable battery are also available. Likewise, possible irreversible damage to the rechargeable battery and corresponding repairs and idle time can be avoided. The safety of such a rechargeable battery is increased.

In one embodiment of the method, an error memory entry is stored in connection with every software reset which is sent to a cell supervision circuit. The error memory is preferably located in the control device. The error memory entry preferably stores which cell supervision circuit has not gone into the sleep mode. Furthermore, how often a sleep command has been sent to said cell supervision circuit is preferably stored. The error memory may be a counter which counts the performances of the attempts to send a successful sleep command, in particular with reference to a particular cell supervision circuit. The error memory entry can also include data relating to the send times of one or more sleep commands or confirmation requests for the transfer into the sleep mode. Preferably, the error memory entries are stored in a sorted manner, in particular in a chronologically sorted manner. Particularly preferably, such an error memory entry is made for each of the cell supervision circuits, in particular for those which are not in the sleep mode after a sleep command. Information relating to cell supervision circuits which have already been compulsorily disconnected at an earlier time can also be stored in the error memory. This can be determined, for example, using the number of failed sleep commands. Using this information about compulsory disconnection, the control device can be prevented from waiting for a confirmation from such cell supervision circuits. Using the error memory entries, faulty units can be detected, software errors and incompatibilities can be uncovered or understood. This can take place, in particular, after successful functional recovery of the cell supervision circuits. Error memory entries can be used to clear any system disturbances of cell supervision circuits and thus to reduce future problems.

In a preferred embodiment of the method, the error memory entry is only made if the number of sleep commands which have been sent to a cell supervision circuit is lower than a predefined number. There is therefore a maximum number of attempts to transfer the cell supervision circuit into the sleep mode until said attempts are stored in the error memory. In particular, the cell supervision circuit is compulsorily disconnected after the maximum number of attempts.

In another embodiment of the method, the renewed sleep command is only sent after a time interval after the software-reset command is sent by the control device. Said command preferably goes to all cell supervision circuits which have not transferred into the sleep mode and for which, in particular, an entry has been made in the error memory. Owing to the time interval, there is still time for the cell supervision circuits to reset their software into a responsive state. In particular, in this case, a processor or the like is reset and/or rebooted or transferred into a defined state.

In another embodiment of the method, a compulsory disconnection of a cell supervision circuit is performed if, after a predefined number of sleep commands sent to said cell supervision circuit, it has not transferred into the sleep mode. Compulsory disconnection is a possibility subsequent to the software-reset attempts to disconnect the cell supervision circuit from its cell in order to prevent the exhaustive discharge thereof. In the corresponding connection lines between the cell supervision circuit and its cell, interruption devices can be installed which can be opened for the purpose of compulsory disconnection. The interruption devices prevent the cell supervision circuit continuing to take current from the cell. Further software-reset attempts can then cease.

In another embodiment of the method, the control device transfers itself into a sleep mode in order to reduce its current consumption from the rechargeable battery, which occurs after the control device has received confirmations of sleep mode from all cell supervision circuits to which it has sent a sleep command. Preferably, this takes place after the last cell supervision circuit has sent a confirmation. In certain circumstances, a sleep command has been sent multiple times to some cell supervision circuits and, optionally, one or more software-reset commands have been sent.

In a further aspect of the invention, a lithium-ion rechargeable battery is proposed, which has a control device, a cell and a cell supervision circuit connected to the cell, wherein the lithium-ion rechargeable battery is designed to perform one of the above-described methods.

BRIEF DESCRIPTION OF THE DRAWINGS

The exemplary embodiments of the invention are described in detail below with reference to the appended drawings, in which.

DETAILED DESCRIPTION

Figure 1:
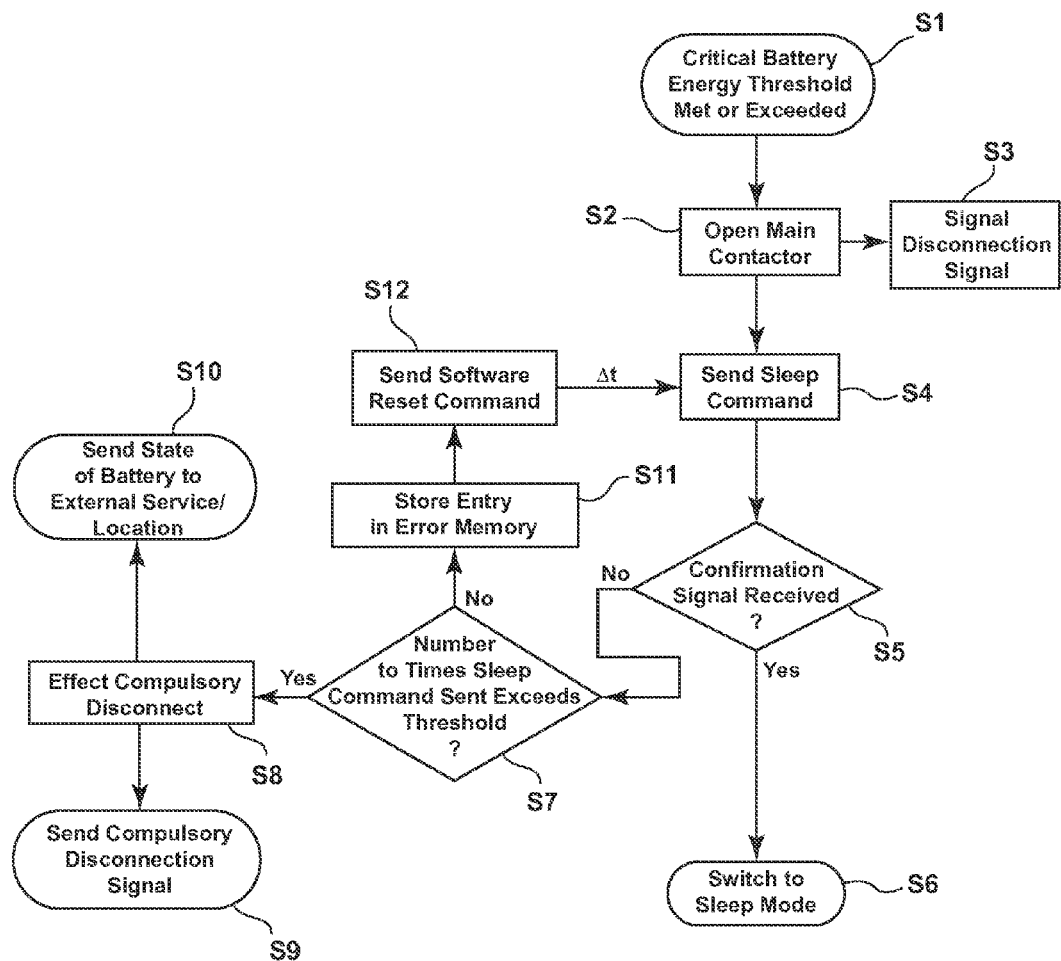
FIG. 1 is a schematic illustration of a method sequence of a first embodiment of the method according to the invention.

FIG. 1 schematically shows the sequence of a first embodiment of a method for effecting a sleep mode of a cell supervision circuit of a lithium-ion rechargeable battery. The cell supervision circuit is connected by power supply connections and/or measurement connections to a cell of the rechargeable battery in order to monitor the state of said cell, in particular the cell voltage thereof. State information relating to the cell can be sent from the cell supervision circuit via one or more signal connections to a control device of the rechargeable battery, which control device monitors the state of the rechargeable battery by means of the cell supervision circuits. In particular, a CAN bus is used for this purpose. A state which is critical for the rechargeable battery with respect to the danger of an exhaustive discharge can arise, for example, if an electrically drivable vehicle in which the rechargeable battery is installed has consumed the energy of said rechargeable battery up to a critical threshold. This is detected by the cell supervision circuits in a step S1.

If a cell voltage of one or more cells is in a critically low range, this leads, in a step S2, to a main contactor by means of which the rechargeable battery can be isolated from its external consumers being opened. However, the power supply of the cell supervision circuits from the rechargeable battery or measuring lines between cell supervision circuits and the cell monitored thereby is not interrupted by the isolation of the external consumers. Thus it is possible for current to still flow from the rechargeable battery through cell supervision circuits and to discharge the rechargeable battery. In a step S3, a disconnection signal is sent to a user of the rechargeable battery. In order to prevent further current consumption by the cell supervision circuits, the control device sends a sleep command to the cell supervision circuits in a step S4 in order to transfer said cell supervision circuits into the sleep mode. In a step S5, the control device expects a confirmation signal from the cell supervision circuits, in particular from those to which a sleep command was sent. If this criterion is fulfilled, then, in a step S6, the control device switches itself into the sleep mode and the method is ended. In this way, the current consumption is further reduced. If no confirmation signal is received from any cell supervision circuit, the method transfers via a feedback loop from the step S5 to the step S4 again. A further step S7 is intermediately connected in the feedback loop, which step accesses information relating to a number of sleep commands which the control device has sent to cell supervision circuits. Alternatively or in addition, the number of times which the feedback loop has been performed can also be stored, in particular for individual cell supervision circuits. In step S7, it is checked how often the sleep command has already been sent. If the number of sendings does not exceed a predefined limit value X, then, in a subsequent step S11, an entry is made in an error memory. By way of example, the number of times the feedback loop has been performed or the number of sleep commands which have been sent to a cell supervision circuit can be encoded by the number of such entries in the error memory. Preferred limit values X lie in an interval from 2 to 5 and are particularly preferably 3 or 4. In a subsequent step S12, a software-reset command is sent to cell supervision circuits which have not sent a confirmation signal in response to the sleep command, said software-reset command being, for example, a level or an edge sent to a reset input of the cell supervision circuits, in particular a central unit, for example of a microcontroller or the like or a communication device of the cell supervision circuits, or a data code is sent via a communication line, which data code effects a reset of the cell supervision circuits, in particular of the central units thereof or of the communication devices thereof. As an alternative to a reset, a jump to a particular point in the program sequence can also be effected, from which point, in particular, a reboot of the cell supervision circuits is possible. Alternatively or in addition, data in a temporary memory can be erased, which data possibly leads to erroneous behavior of the cell supervision circuits. In one variant, said data may be replaced at least partially by standard values. After a wait time Δt, by means of which the cell supervision circuits are given the opportunity to return to a regular operating state, the method transfers from step S12 to step S4 again, as a result of which the loop composed of the method steps S4, S5, S7, S11 and S12 is closed. However, if it is determined in step S7 that the sleep command has already been sent X times, the method transfers to the step S8 in which a compulsory disconnection of cell supervision circuits which are not yet in the sleep mode is effected. These are the cell supervision circuits from which a confirmation signal was expected but, despite a sleep command having been sent X times, said confirmation signal was not received. The compulsory disconnection can be effected by means of an interruption device by means of which a power supply between the rechargeable battery and a cell supervision circuit can be interrupted. The interruption device can be controlled from the control device, preferably independently of other processes. Preferably, for said control, signal lines are provided which are independent from the normal communication between the control device and the cell supervision circuits. In a further step S9, after compulsory disconnection has occurred, a compulsory disconnection signal is sent to a user of the rechargeable battery. Said user is therefore informed that a cell supervision circuit could not be transferred into the sleep mode. In a step S10, which optionally follows the step S8, an external receiver, for example an emergency service, the manufacturer of the rechargeable battery, a workshop or a vehicle manufacturer of a vehicle in which the rechargeable battery is installed, or a similar place is informed about the state of the rechargeable battery. This can take place, for example, via a mobile telephone network.

Figure 2:
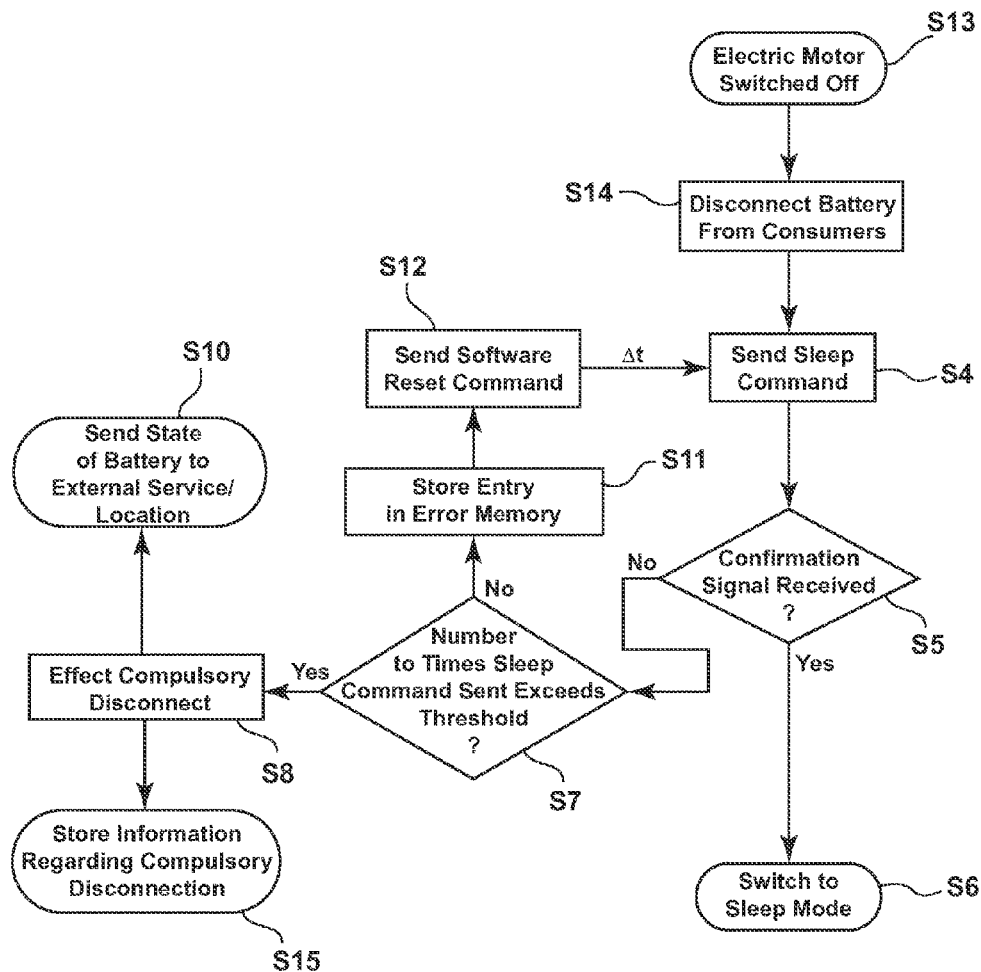
FIG. 2 is a schematic illustration of a method sequence of a second embodiment of the method according to the invention.

FIG. 2 schematically shows the sequence of a second embodiment of a method for effecting a sleep mode of a cell supervision circuit of a lithium-ion rechargeable battery. The second embodiment is largely the same as the embodiment shown in FIG. 1. Identical method steps are referred to with identical reference numerals and are not specifically described again. In relation hereto, reference should be made to the statements made in connection with FIG. 1. In contrast to the first embodiment, the method is not triggered in reaction to a cell voltage which is so low that it is in a critical range, but rather by an electric motor which is supplied by the lithium-ion rechargeable battery being switched off, for example, because a vehicle in which the electric motor and the rechargeable battery are installed is to be parked. The start of the method according to the second embodiment is the step S13, in which the electric motor is switched off. In a subsequent step S14, further consumers which are supplied by the lithium-ion rechargeable battery are shut down. These are, for example, end consumers which are supplied with voltages in the low-volt range. By means of the shut-down, the current consumption of said consumers is reduced. During an idle time, the rechargeable battery is therefore discharged to a lesser degree. The method is then transferred to the step S4 in which the control device (BCU) sends a sleep command to each of the cell supervision circuits.

A further difference between the first and the second embodiment is the step S15 of the second embodiment, which follows the step S8 of the compulsory disconnection of one or more cell supervision circuits. In the step S15, information relating to a cell supervision circuit which was compulsorily disconnected is stored, preferably in an error memory. This can belong to the control device or to a vehicle control device of the vehicle in which the rechargeable battery is installed. The step S15 can also be performed in the first embodiment after the step S8.

What is claimed is:

1. A method for effecting a sleep mode of a cell supervision circuit of a rechargeable battery, the method comprising:
   determining, with an electronic control device, that the cell supervision circuit is not in the sleep mode after at least one sleep command is sent from the electronic control device to the cell supervision circuit,
   sending a command for a software reset of the cell supervision circuit from the electronic control device to the cell supervision circuit after determining that the cell supervision circuit is not in the sleep mode, and
   disconnecting the cell supervision circuit by sending a signal from the electronic control device to an interruption device located between the cell supervision circuit and a cell an when the number of sleep commands sent to the cell supervision circuit is greater than or equal to a predefined number of sleep commands sent from a control device to the cell supervision circuit.

2. The method according to claim 1, in which an error memory entry is stored within the electronic control device in connection with sending the signal, from the electronic control device, for a software reset of the cell supervision circuit.

3. The method according to claim 1, in which the error memory entry is stored when the number of sleep commands sent to the cell supervision circuit is lower than a predefined number of sleep commands sent to the cell supervision circuit.

4. The method according to claim 1, in which a renewed sleep command is sent to the cell supervision circuit after a software reset of the cell supervision circuit.

5. The method according to claim 4, in which the sending of the renewed sleep command takes place after a time interval after the sending of the command for a software reset of the cell supervision circuit.

6. The method according to claim 1, in which the electronic control device is transferred into a sleep mode after it has received the confirmation from the cell supervision circuit.

* * * * *